(12) United States Patent
Hirokawa et al.

(10) Patent No.: US 11,539,299 B2
(45) Date of Patent: *Dec. 27, 2022

(54) SWITCHING POWER SUPPLY UNIT AND ELECTRIC POWER SUPPLY SYSTEM

(71) Applicant: TDK CORPORATION, Tokyo (JP)

(72) Inventors: Masahiko Hirokawa, Tokyo (JP); Naoyuki Ishibashi, Tokyo (JP); Xiaofeng Wu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 17/224,418

(22) Filed: Apr. 7, 2021

(65) Prior Publication Data

US 2021/0336547 A1    Oct. 28, 2021

(30) Foreign Application Priority Data

Apr. 28, 2020 (JP) .............................. JP2020-078944

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC .. H02M 3/33571; H02M 3/01; H02M 7/4837; H02M 1/0095; H02M 3/33569; H02M 7/06; H02M 7/5387; Y02B 70/10
See application file for complete search history.

(56) References Cited

U.S. PATENT DOCUMENTS

| | | | |
|---|---|---|---|
| 6,349,044 B1* | 2/2002 | Canales-Abarca | H02M 1/34 363/56.08 |
| 6,353,547 B1* | 3/2002 | Jang | H02M 7/487 363/16 |
| 9,871,467 B2* | 1/2018 | Liang | H02M 7/4811 |
| 2006/0062034 A1* | 3/2006 | Mazumder | H02M 7/4837 363/131 |
| 2009/0154200 A1* | 6/2009 | Coccia | H02M 3/3376 363/21.02 |

(Continued)

FOREIGN PATENT DOCUMENTS

JP    2016-189636 A    11/2016

*Primary Examiner* — Kyle J Moody
(74) *Attorney, Agent, or Firm* — Oliff PLC

(57) ABSTRACT

A switching power supply unit includes a pair of input terminals, a pair of output terminals, a transformer, an inverter circuit, a rectifying and smoothing circuit, and a driver. The inverter circuit includes first to fourth switching devices, a first capacitor, a resonant inductor, and a resonant capacitor. The rectifying and smoothing circuit includes a rectifying circuit including rectifying devices, and a smoothing circuit. The first to fourth switching devices are coupled in series in this order between two input terminals constituting the pair of input terminals. The first capacitor is disposed between a connection point between the first and second switching devices and a connection point between the third and fourth switching devices. The resonant inductor, the resonant capacitor, and a primary winding are coupled in series in no particular order between a connection point between the second and third switching devices and one of the two input terminals.

8 Claims, 12 Drawing Sheets

(56) References Cited

U.S. PATENT DOCUMENTS

| | | | |
|---|---|---|---|
| 2011/0222317 A1* | 9/2011 | Coccia | H02M 3/337 |
| | | | 363/21.02 |
| 2020/0091828 A1* | 3/2020 | Fang | H02M 3/33569 |
| 2022/0021312 A1* | 1/2022 | Hirokawa | H02M 3/33592 |

* cited by examiner

SWITCHING POWER SUPPLY UNIT AND ELECTRIC POWER SUPPLY SYSTEM

CROSS REFERENCE TO RELATED APPLICATIONS

This application claims the benefit of Japanese Priority Patent Application No. 2020-078944 filed on Apr. 28, 2020, the entire contents of which are incorporated herein by reference.

BACKGROUND

The technology relates to a switching power supply unit that performs voltage conversion using switching devices, and an electric power supply system including such a switching power supply unit.

As some examples of a switching power supply unit, various DC-DC converters have been proposed and put into practical use (see, for example, Japanese Unexamined Patent Application Publication No. 2016-189636). Such DC-DC converters each typically include an inverter circuit, a power conversion transformer, and a rectifying and smoothing circuit. The inverter circuit includes switching devices.

SUMMARY

A switching power supply unit according to one embodiment of the technology includes a pair of input terminals, a pair of output terminals, a transformer, an inverter circuit, a rectifying and smoothing circuit, and a driver. The pair of input terminals is configured to receive an input voltage. The pair of output terminals is configured to output an output voltage. The transformer includes a primary winding and a secondary winding. The inverter circuit is disposed between the pair of input terminals and the primary winding, and includes first to fourth switching devices, a first capacitor, a resonant inductor, and a resonant capacitor. The rectifying and smoothing circuit is disposed between the pair of output terminals and the secondary winding, and includes a rectifying circuit and a smoothing circuit. The rectifying circuit includes two or more rectifying devices. The smoothing circuit includes a second capacitor. The driver is configured to perform switching driving to control respective operations of the first to fourth switching devices in the inverter circuit. The first to fourth switching devices are coupled in series to each other in this order between two input terminals constituting the pair of input terminals. The first capacitor is disposed between a first connection point and a second connection point. The first connection point is a connection point between the first switching device and the second switching device. The second connection point is a connection point between the third switching device and the fourth switching device. The resonant inductor, the resonant capacitor, and the primary winding are coupled in series to each other in no particular order between a third connection point and one of the two input terminals constituting the pair of input terminals. The third connection point is a connection point between the second switching device and the third switching device.

An electric power supply system according to one embodiment of the technology includes the switching power supply unit according to the embodiment of the technology, and a power source configured to supply the input voltage to the pair of input terminals.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
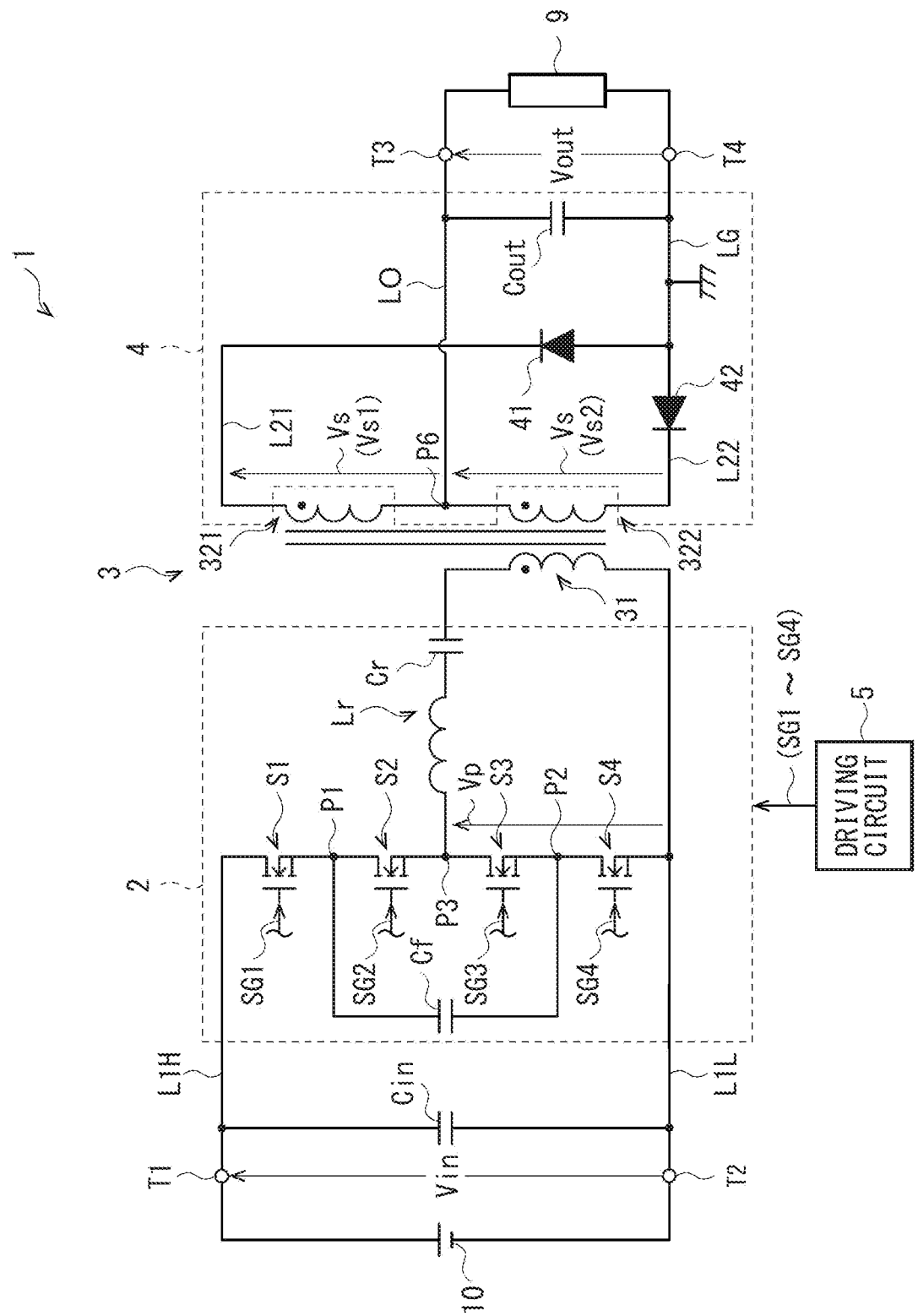
FIG. 1 is a circuit diagram illustrating a schematic configuration example of a switching power supply unit according to one example embodiment of the technology.

In general, a reduction in power loss is demanded of a switching power supply unit such as a DC-DC converter. It is desirable to provide a switching power supply unit that makes it possible to reduce a power loss, and an electric power supply system including such a switching power supply unit.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. The description is given in the following order.

1. Example Embodiment (an example including a center-tap rectifying circuit)
2. Modification Examples
    Modification Example 1 (an example including a bridge rectifying circuit)
    Modification Examples 2 and 3 (examples in which the respective rectifying circuits in the example embodiment and Modification Example 1 are each replaced with a synchronous rectifying circuit)
3. Other Modification Examples

1. Example Embodiment

[Configuration]

FIG. 1 illustrates a schematic configuration example of a switching power supply unit according to an example embodiment of the technology, i.e., a switching power supply unit 1, in a circuit diagram. The switching power supply unit 1 may function as a DC-DC converter that performs voltage conversion on a direct-current input voltage Vin supplied from a direct-current input power source 10 (e.g., a battery) into a direct-current output voltage Vout, and supplies electric power to a load 9. Examples of the load 9 include an electronic apparatus and a battery. As described below, the switching power supply unit 1 may be a so-called "(insulated half-bridge) LLC resonant" DC-DC converter. Note that the voltage conversion to be performed by the switching power supply unit 1 may be either up-conversion (step-up) or down-conversion (step-down).

The direct-current input voltage Vin may correspond to a specific but non-limiting example of an "input voltage" of one embodiment of the technology. The direct-current output voltage Vout may correspond to a specific but non-limiting example of an "output voltage" of one embodiment of the technology. The direct-current input power source 10 may correspond to a specific but non-limiting example of a "power source" of one embodiment of the technology. A system including the direct-current input power source 10 and the switching power supply unit 1 may correspond to a specific but non-limiting example of an "electric power supply system" of one embodiment of the technology.

The switching power supply unit 1 includes two input terminals T1 and T2, two output terminals T3 and T4, an inverter circuit 2, a transformer 3, a rectifying and smoothing circuit 4, and a driving circuit 5. The switching power supply unit 1 may further include an input smoothing capacitor Cin. The direct-current input voltage Vin may be inputted to between the input terminals T1 and T2. The direct-current output voltage Vout may be outputted from between the output terminals T3 and T4.

The input terminals T1 and T2 may correspond to a specific but non-limiting example of a "pair of input terminals" of one embodiment of the technology. The output terminals T3 and T4 may correspond to a specific but non-limiting example of a "pair of output terminals" of one embodiment of the technology.

The input smoothing capacitor Cin may be disposed between a primary high-voltage line L1H coupled to the input terminal T1 and a primary low-voltage line L1L coupled to the input terminal T2. In a specific but non-limiting example, at a location between the inverter circuit 2 described below and the input terminals T1 and T2, a first end or one end of the input smoothing capacitor Cin may be coupled to the primary high-voltage line L1H, while a second end or another end of the input smoothing capacitor Cin may be coupled to the primary low-voltage line L1L. The input smoothing capacitor Cin may be a capacitor adapted to smooth the direct-current input voltage Vin inputted from the input terminals T1 and T2.

[Inverter Circuit 2]

The inverter circuit 2 is disposed between the pair of input terminals T1 and T2 and a primary winding 31 of the transformer 3 to be described later. The inverter circuit 2 includes four switching devices S1, S2, S3, and S4, a capacitor Cf (a flying capacitor), a resonant inductor Lr, and a resonant capacitor Cr. The inverter circuit 2 may thus be a so-called "half-bridge" inverter circuit. Note that the resonant inductor Lr may be configured by a leakage inductance of the transformer 3 to be described later, or may be provided independently of such a leakage inductance.

The switching device S1 may correspond to a specific but non-limiting example of a "first switching device" of one embodiment of the technology. The switching device S2 may correspond to a specific but non-limiting example of a "second switching device" of one embodiment of the technology. The switching device S3 may correspond to a specific but non-limiting example of a "third switching device" of one embodiment of the technology. The switching device S4 may correspond to a specific but non-limiting example of a "fourth switching device" of one embodiment of the technology. The capacitor Cf may correspond to a specific but non-limiting example of a "first capacitor" of one embodiment of the technology.

For example, metal oxide semiconductor-field effect transistors (MOS-FETs), insulated gate bipolar transistors (IGBTs), or other switch devices may be used as the switching devices S1 to S4. FIG. 1 illustrates an example in which the switching devices S1 to S4 are configured by MOS-FETs. In the case where MOS-FETs are used as the switching devices S1 to S4 like this example, parasitic capacitances and parasitic diodes of the MOS-FETs are usable to configure capacitors and diodes (not illustrated in FIG. 1) to be coupled in parallel to the switching devices S1 to S4.

In the inverter circuit 2, the four switching devices S1, S2, S3, and S4 are coupled in series to each other in this order between the input terminals T1 and T2, i.e., between the primary high-voltage line L1H and the primary low-voltage line L1L. In a specific but non-limiting example, the switching device S1 may be disposed between the primary high-voltage line L1H and a connection point P1; the switching device S2 may be disposed between the connection point P1 and a connection point P3; the switching device S3 may be disposed between the connection point P3 and a connection point P2; and the switching device S4 may be disposed between the connection point P2 and the primary low-voltage line L1L.

Further, in the inverter circuit 2, the capacitor Cf is disposed between the connection point P1 and the connection point P2. The connection point P1 is a connection point between the switching devices S1 and S2. The connection point P2 is a connection point between the switching devices S3 and S4. In a specific but non-limiting example, a first end of the capacitor Cf may be coupled to the connection point P1, and a second end of the capacitor Cf may be coupled to the connection point P2.

Further, the resonant inductor Lr, the resonant capacitor Cr, and the primary winding 31 of the transformer 3 to be described later are coupled in series to each other between the connection point P3 and one of the input terminals T1 and T2. In the example in FIG. 1, the one of the input terminals T1 and T2 is the input terminal T2. The connection point P3 is a connection point between the switching devices S2 and S3. In a specific but non-limiting example, as illustrated in FIG. 1, a first end of the resonant inductor Lr may be coupled to the connection point P3; a second end of the resonant inductor Lr may be coupled to a first end or one end of the resonant capacitor Cr; a second end or another end of the resonant capacitor Cr may be coupled to one end of the primary winding 31 described above; and another end of the primary winding 31 may be coupled to the input terminal T2.

The connection point P1 described above may correspond to a specific but non-limiting example of a "first connection point" of one embodiment of the technology. The connection point P2 described above may correspond to a specific but non-limiting example of a "second connection point" of one embodiment of the technology. The connection point P3 described above may correspond to a specific but non-limiting example of a "third connection point" of one embodiment of the technology.

With such a configuration, in the inverter circuit 2, the switching devices S1 to S4 may perform switching operations, i.e., on and off operations in accordance with drive signals SG1 to SG4 supplied from the driving circuit 5 to be described later. This allows the direct-current input voltage Vin applied to between the input terminals T1 and T2 to be converted into an alternating-current voltage (a voltage Vp), and allows the resulting alternating-current voltage to be outputted to the transformer 3 (the primary winding 31).

[Transformer 3]

The transformer 3 may include the primary winding 31 and two secondary windings 321 and 322.

The primary winding 31 may have a first end (the one end) coupled to the second end (the other end) of the resonant capacitor Cr described above, and a second end (the other end) coupled to the input terminal T2 via the primary low-voltage line L1L.

The secondary winding 321 may have a first end coupled to a cathode of a rectifying diode 41 to be described later via a connection line L21 to be described later. The secondary winding 321 may have a second end coupled to a center tap P6 in the rectifying and smoothing circuit 4 to be described later. The secondary winding 322 may have a first end coupled to a cathode of a rectifying diode 42 to be described later via a connection line L22 to be described later. The secondary winding 322 may have a second end coupled to the center tap P6 described above. That is, the second end of the secondary winding 321 and the second end of the secondary winding 322 may be coupled in common to the center tap P6.

The transformer 3 may be configured to perform voltage conversion on a voltage generated by the inverter circuit 2, that is, the multi-leveled voltage Vp (see FIG. 1) to be inputted to the primary winding 31 of the transformer 3, and to output an alternating-current voltage, i.e., a voltage Vs, from the end of each of the secondary windings 321 and 322. In a specific but non-limiting example, a voltage Vs1 may be outputted from the secondary winding 321, and a voltage Vs2 may be outputted from the secondary winding 322 (see FIG. 1). Note that the voltage conversion degree of the output voltage with respect to the input voltage in this case may be determined on the basis of a turns ratio of the primary winding 31 to the secondary windings 321 and 322, and a duty ratio of an ON period Ton to a switching cycle Tsw (see FIG. 2) to be described later.

[Rectifying and Smoothing Circuit 4]

The rectifying and smoothing circuit 4 may include two rectifying diodes 41 and 42 and a single output smoothing capacitor Cout. In a specific but non-limiting example, the rectifying and smoothing circuit 4 includes a rectifying circuit including the rectifying diodes 41 and 42, and a smoothing circuit including the output smoothing capacitor Cout.

The two rectifying diodes 41 and 42 described above may correspond to a specific but non-limiting example of "two or more rectifying devices" of one embodiment of the technology. The output smoothing capacitor Cout may correspond to a specific but non-limiting example of a "second capacitor" of one embodiment of the technology.

The rectifying circuit described above may be a so-called "center-tap" rectifying circuit. That is, respective anodes of the rectifying diodes 41 and 42 may be coupled to a ground line LG; the cathode of the rectifying diode 41 may be coupled to the above-described first end of the secondary winding 321 via the connection line L21; and the cathode of the rectifying diode 42 may be coupled to the above-described first end of the secondary winding 322 via the connection line L22. Further, as described above, the respective second ends of the secondary windings 321 and 322 may be coupled in common to the center tap P6. The center tap P6 may be coupled to the output terminal T3 described above via an output line LO. Note that the ground line LG described above may be coupled to the output terminal T4 described above.

In the smoothing circuit described above, the output smoothing capacitor Cout may be coupled between the output line LO described above and the ground line LG, i.e., between the output terminals T3 and T4. That is, a first end of the output smoothing capacitor Cout may be coupled to the output line LO, and a second end of the output smoothing capacitor Cout may be coupled to the ground line LG.

In the rectifying and smoothing circuit 4 having such a configuration, the rectifying circuit including the rectifying diodes 41 and 42 may rectify the alternating-current voltage (the voltage Vs) outputted from the transformer 3, and then output the rectified voltage. Further, the smoothing circuit including the output smoothing capacitor Cout may smooth the voltage rectified by the rectifying circuit described above to generate the direct-current output voltage Vout. The direct-current output voltage Vout thus generated may allow electric power to be supplied to the load 9 described above from the output terminals T3 and T4.

[Driving Circuit 5]

The driving circuit 5 is a circuit that performs switching driving to control the respective operations of the switching devices S1 to S4 in the inverter circuit 2. In a specific but non-limiting example, the driving circuit 5 may be configured to supply the switching devices S1 to S4 with the respective drive signals SG1 to SG4 independently of each other to thereby control the respective switching operations, i.e., on and off operations, of the switching devices S1 to S4.

In controlling the switching operations, i.e., performing the switching driving, of the switching devices S1 to S4, the driving circuit 5 may perform pulse width control, which will be described in detail later. That is, the driving circuit 5 may perform pulse width modulation (PWM) control on the drive signals SG1 to SG4.

Further, while a detailed description will be given later, the driving circuit 5 may perform the above-described switching driving in such a manner that respective switching frequencies fsw of the switching devices S1 to S4 are identical or substantially identical with each other and constant or substantially constant.

Note that the driving circuit 5 described above may correspond to a specific but non-limiting example of a "driver" of one embodiment of the technology.

Operations, Workings, and Effects

A. Basic Operation

In the switching power supply unit 1, the direct-current input voltage Vin supplied from the direct-current input power source 10 via the input terminals T1 and T2 may be switched by the inverter circuit 2 to generate the multi-leveled voltage, i.e., the voltage Vp. The multi-leveled voltage may be supplied to the primary winding 31 of the transformer 3, and may then be transformed by the transformer 3. The transformed alternating-current voltage, i.e., the voltage Vs, may thus be outputted from each of the secondary windings 321 and 322.

In the rectifying and smoothing circuit 4, the alternating-current voltage outputted from the transformer 3, i.e., the transformed alternating-current voltage described above, may be rectified by the rectifying diodes 41 and 42 in the rectifying circuit and then smoothed by the output smoothing capacitor Cout in the smoothing circuit. The direct-current output voltage Vout may be thereby outputted from the output terminals T3 and T4. The direct-current output voltage Vout may then allow electric power to be supplied to the load 9.

B. Detailed Operation

Next, a description will be given of detailed operation of the switching power supply unit 1, i.e., details of the pulse width control described above, with reference to FIGS. 2 to 10 as well as FIG. 1.

Figure 2:
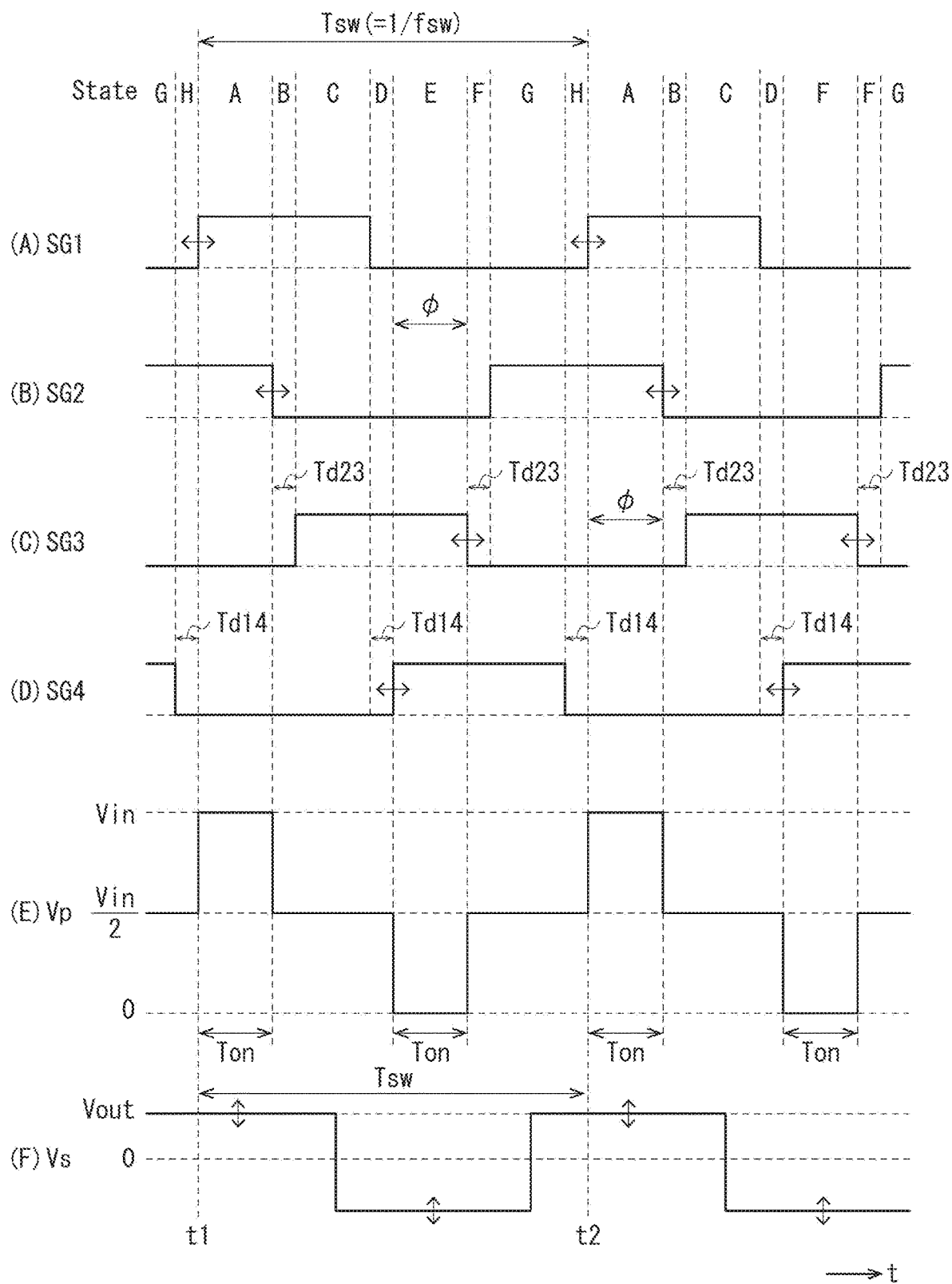
FIG. 2 is a timing waveform diagram illustrating an operation example of the switching power supply unit illustrated in FIG. 1.

FIG. 2 illustrates an operation example of the switching power supply unit 1 in a timing waveform diagram. Specifically, parts (A) to (D) of FIG. 2 illustrate voltage waveforms of the drive signals SG1 to SG4 described above, respectively, and parts (E) and (F) of FIG. 2 illustrate voltage waveforms of the voltages Vp and Vs described above, respectively. The horizontal axis of FIG. 2 represents time t.

Note that a period during which each of the drive signals SG1 to SG4 is "high (H)" may correspond to a period during which a corresponding one of the switching devices S1 to S4 is on. A period during which each of the drive signals SG1 to SG4 is "low (L)" may correspond to a period during which a corresponding one of the switching devices S1 to S4 is off.

Further, in the example of FIG. 2, phase differences φ (i.e., a phase difference φ between the drive signals SG1 and SG2 and a phase difference φ between the drive signals SG3 and SG4) upon the pulse width control by a phase shift method are indicated, which will be described in detail later. Further, in the example of FIG. 2, a period during which both the drive signals SG1 and SG4 are "L", that is, a period during which both the switching devices S1 and S4 are off, which will be referred to as a first dead time, is indicated as a dead time Td14. Likewise, in the example of FIG. 2, a period during which both the drive signals SG2 and SG3 are "L", that is, a period during which both the switching devices S2 and S3 are off, which will be referred to as a second dead time, is indicated as a dead time Td23. In addition, in the example of FIG. 2, a period during which both the drive signals SG1 and SG2 are "H", that is, a period during which both the switching devices S1 and S2 are on, which will be referred to as a first ON period, is indicated as an ON period Ton. Likewise, in the example of FIG. 2, a period during which both the drive signals SG3 and SG4 are "H", that is, a period during which both the switching devices S3 and S4 are on, which will be referred to as a second ON period, is also indicated as an ON period Ton.

Further, in FIG. 2, eight states (respective states indicated as "State A" to "State H" in FIG. 2) are set along the time t. These eight states may be sequentially repeated (i.e., in the order from "State A" to "State H") to define a switching cycle Tsw (=1/fsw) and a switching frequency fsw (see FIG. 2). In a specific but non-limiting example, the period from a timing t1 to a timing t2 illustrated in FIG. 2, for example, may correspond to the switching cycle Tsw described above. The switching cycle Tsw may include the ON periods Ton, i.e., the first ON period and the second ON period described above, and the dead times Td14 and Td23, i.e., the first dead time and the second dead time described above (see FIG. 2)

FIGS. 3 to 10 illustrate respective operation examples at the above-described eight states illustrated in FIG. 2 (the states indicated as "State A" to "State H" as described above) in circuit diagrams. In the following, the respective operation examples at these states will be described in detail with reference to FIG. 2. Note that regarding the switching devices S1 to S4 configured by MOS-FETs as described above, parasitic diodes D1 to D4 of the switching devices S1 to S4 and parasitic capacitances C2 and C3 of the switching devices S2 and S3 are each illustrated as appropriate in FIGS. 3 to 10.

[State A]

Figure 3:
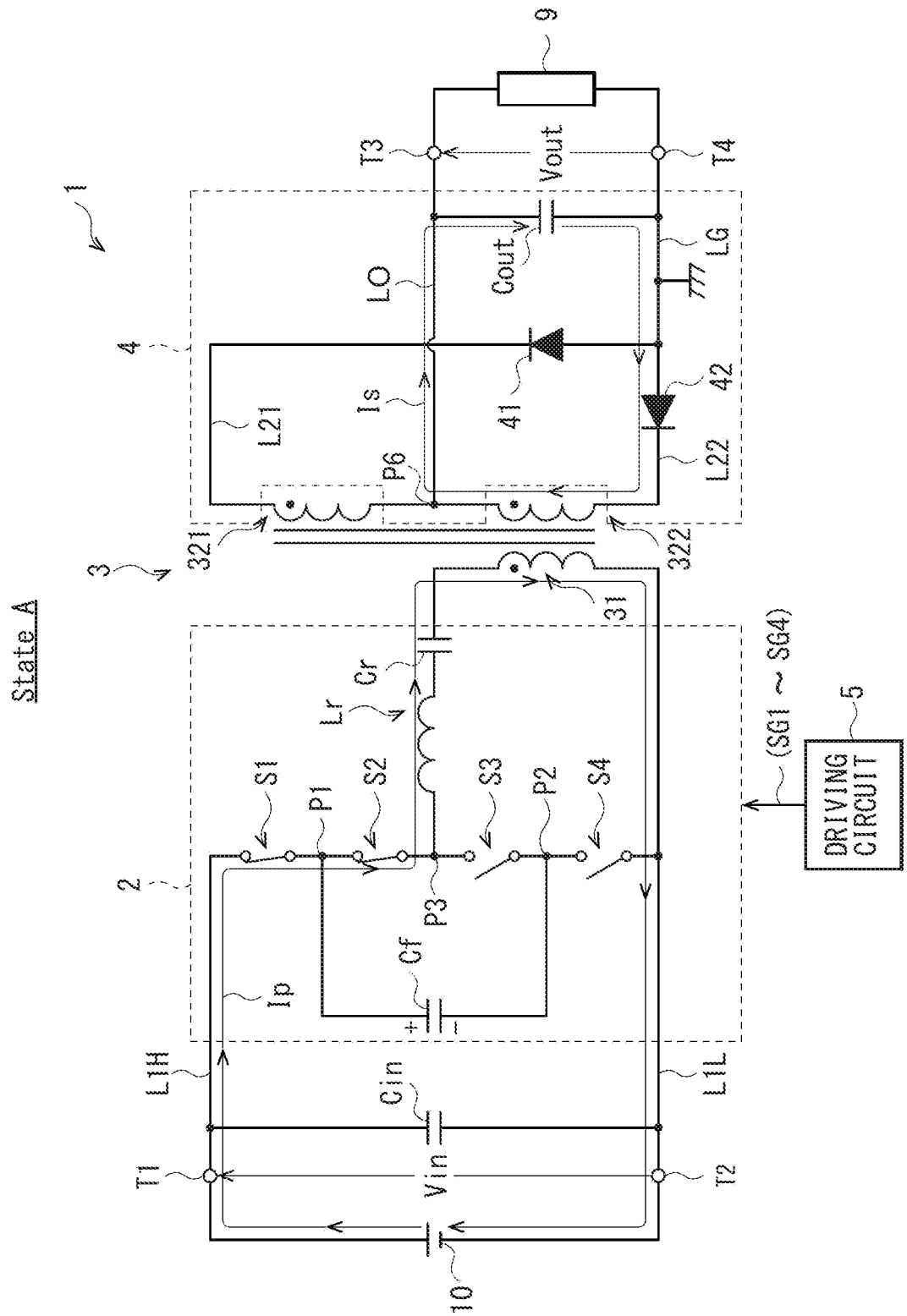
FIG. 3 is a circuit diagram illustrating an operation example at State A illustrated in FIG. 2.

First, at the "State A" illustrated in FIG. 3, the switching devices S1 and S2 may each be set at an ON state, whereas the switching devices S3 and S4 may each be set at an OFF state (see parts (A) to (D) of FIG. 2). Then, on the primary side of the transformer 3, a primary circuit current (a current Ip) flows from the direct-current input power source 10 through the primary high-voltage line L1H, the switching device S1, the switching device S2, the resonant inductor Lr, the resonant capacitor Cr, the primary winding 31, and the primary low-voltage line L1L in this order and back to the direct-current input power source 10. At this time, the value of the voltage Vp is as follows: Vp=Vin (see part (E) of FIG. 2). Then, on the secondary side of the transformer 3, a secondary circuit current (a current Is) flows from the secondary winding 322 through the output line LO, the output smoothing capacitor Cout, the ground line LG, and the rectifying diode 42 in this order and back to the secondary winding 322.

[State B]

Figure 4:
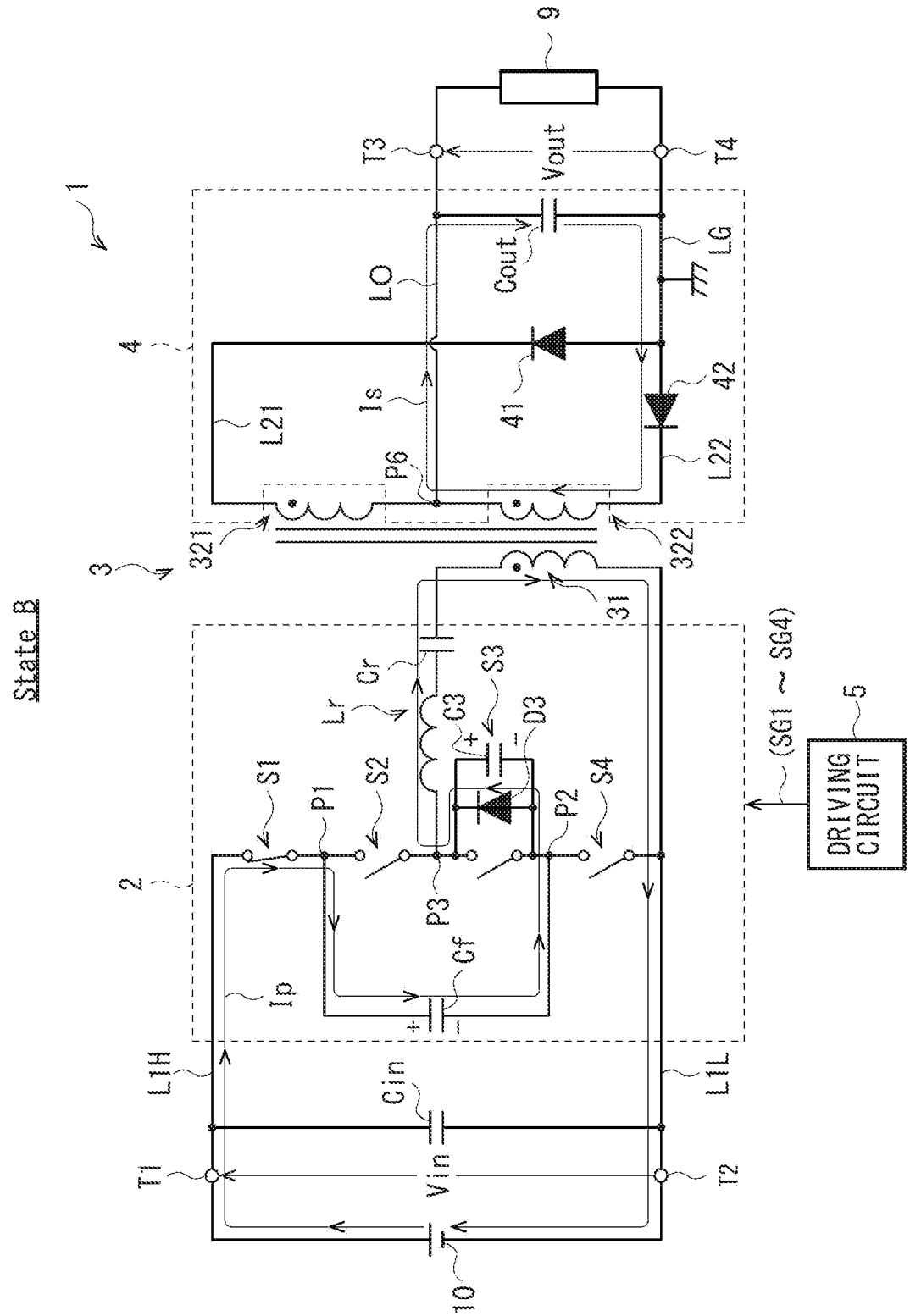
FIG. 4 is a circuit diagram illustrating an operation example at State B illustrated in FIG. 2.

Next, at the "State B" illustrated in FIG. 4, the switching device S2 may be turned off (see part (B) of FIG. 2). Then, on the primary side of the transformer 3, the primary circuit current (the current Ip) flows from the direct-current input power source 10 through the primary high-voltage line L1H, the switching device S1, the capacitor Cf, the parasitic capacitance C3 (and thereafter, the parasitic diode D3) of the switching device S3, the resonant inductor Lr, the resonant capacitor Cr, the primary winding 31, and the primary low-voltage line L1L in this order and back to the direct-current input power source 10. At this time, electric charge is discharged from the parasitic capacitance C3 of the switching device S3, and the parasitic diode D3 described above brings the voltage into a clamped state. The value of the voltage Vp at this time is as follows: Vp=(Vin/2) (see part (E) of FIG. 2). Then, on the secondary side of the transformer 3, the secondary circuit current (the current Is) flows from the secondary winding 322 through the output line LO, the output smoothing capacitor Cout, the ground line LG, and the rectifying diode 42 in this order and back to the secondary winding 322.

[State C]

Figure 5:
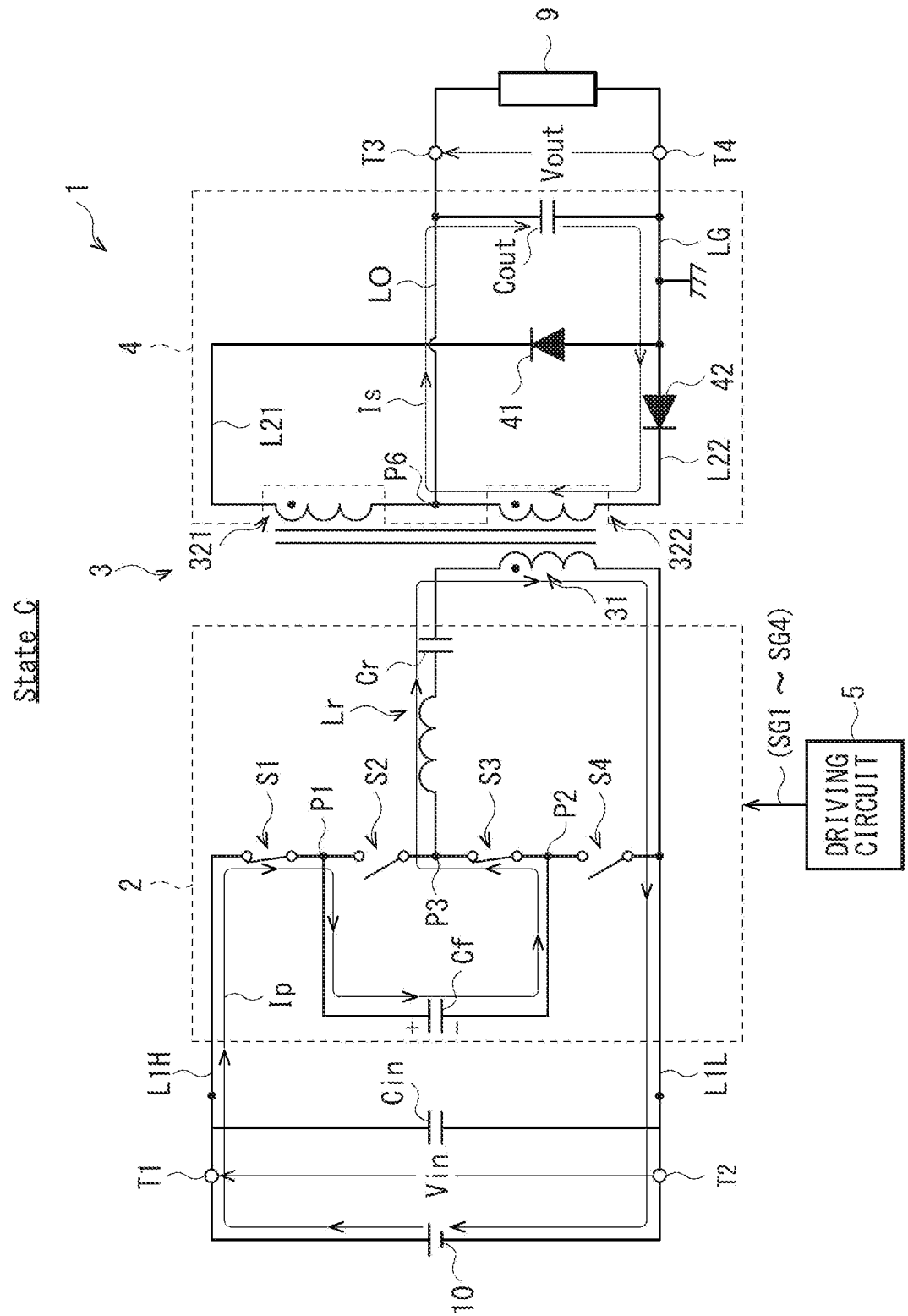
FIG. 5 is a circuit diagram illustrating an operation example at State C illustrated in FIG. 2.

Next, at the "State C" illustrated in FIG. 5, the switching device S3 may be turned on (see part (C) of FIG. 2) and zero-voltage switching (ZVS) may be performed. Then, on the primary side of the transformer 3, the primary circuit current (the current Ip) flows from the direct-current input power source 10 through the primary high-voltage line L1H, the switching device S1, the capacitor Cf, the switching device S3, the resonant inductor Lr, the resonant capacitor Cr, the primary winding 31, and the primary low-voltage line L1L in this order and back to the direct-current input power source 10. At this time, the value of the voltage Vp is as follows: Vp=(Vin/2) (see part (E) of FIG. 2). Then, on the secondary side on the transformer 3, the secondary circuit current (the current Is) flows from the secondary winding 322 through the output line LO, the output smoothing capacitor Cout, the ground line LG, and the rectifying diode 42 in this order and back to the secondary winding 322.

[State D]

Figure 6:
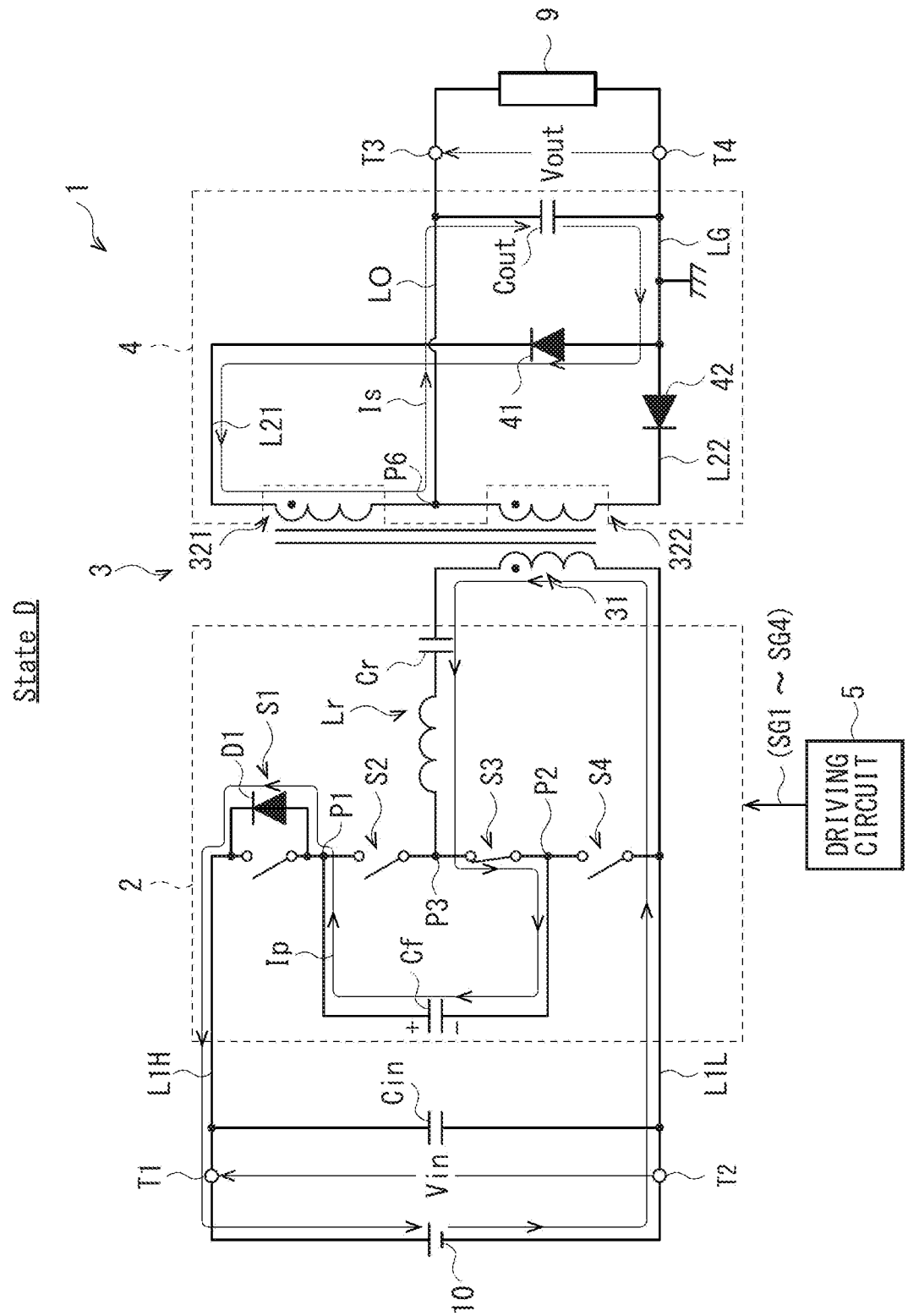
FIG. 6 is a circuit diagram illustrating an operation example at State D illustrated in FIG. 2.

Next, at the "State D" illustrated in FIG. 6, the switching device S1 may be turned off (see part (A) of FIG. 2). Then, on the primary side of the transformer 3, the primary circuit current (the current Ip) flows from the direct-current input power source 10 through the primary low-voltage line L1L, the primary winding 31, the resonant capacitor Cr, the resonant inductor Lr, the switching device S3, the capacitor Cf, the parasitic diode D1 of the switching device 1, and the primary high-voltage line L1H in this order and back to the direct-current input power source 10. Thus, the direction of flow of the current Ip during the preceding period from the "State A" to the "State C" is reversed. At this time, the parasitic diode D1 described above brings the voltage into a clamped state. The value of the voltage Vp at this time is as follows: Vp=(Vin/2) (see part (E) of FIG. 2). Then, on the secondary side of the transformer 3, the secondary circuit current (the current Is) flows from the secondary winding 321 through the output line LO, the output smoothing capacitor Cout, the ground line LG, and the rectifying diode 41 in this order and back to the secondary winding 321. Thus, the current Is flows through a path different from that during the preceding period from the "State A" to the "State C".

[State E]

Figure 7:
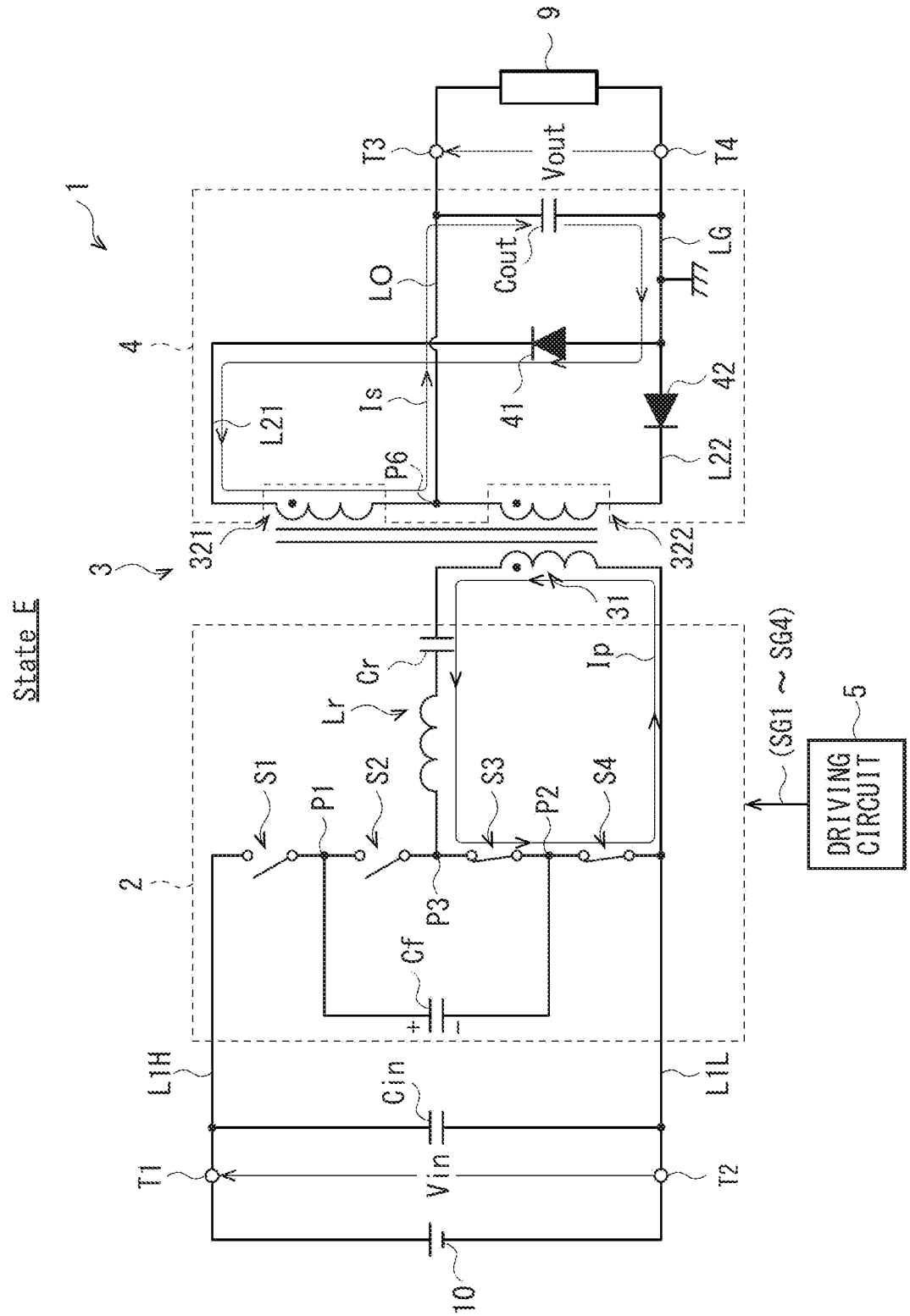
FIG. 7 is a circuit diagram illustrating an operation example at State E illustrated in FIG. 2.

Next, at the "State E" illustrated in FIG. 7, the switching device S4 may be turned on (see part (D) of FIG. 2). Then, on the primary side of the transformer 3, the primary circuit current (the current Ip) flows from the resonant inductor Lr through the switching device S3, the switching device S4, the primary low-voltage line L1L, the primary winding 31, and the resonant capacitor Cr in this order and back to the resonant inductor Lr. The value of the voltage Vp at this time is as follows: Vp=0 (see part (E) of FIG. 2). Then, on the secondary side of the transformer 3, the secondary circuit current (the current Is) flows from the secondary winding 321 through the output line LO, the output smoothing capacitor Cout, the ground line LG, and the rectifying diode 41 in this order and back to the secondary winding 321.

[State F]

Figure 8:
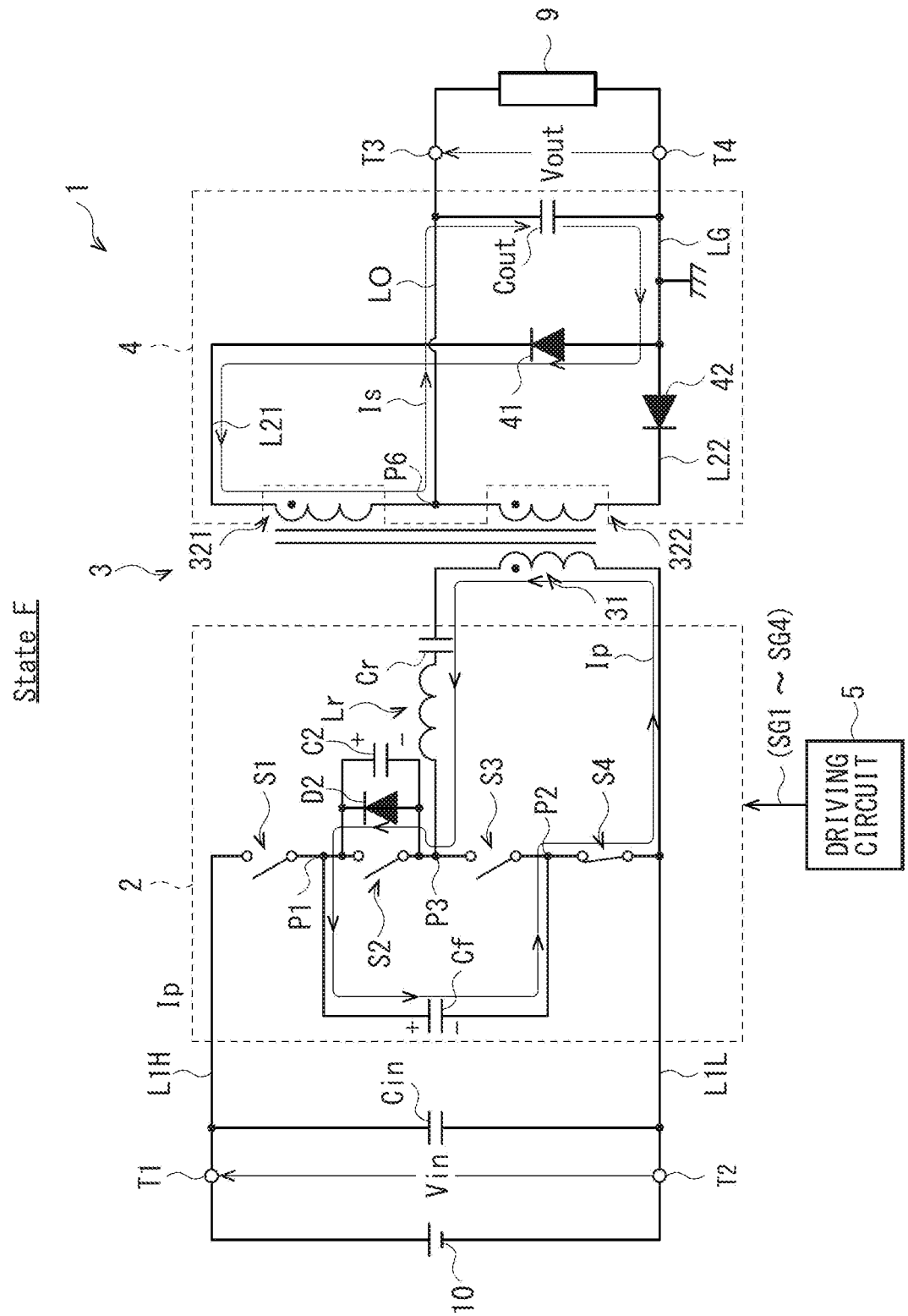
FIG. 8 is a circuit diagram illustrating an operation example at State F illustrated in FIG. 2.

Next, at the "State F" illustrated in FIG. 8, the switching device S3 may be turned off (see part (C) of FIG. 2). Then, on the primary side of the transformer 3, the primary circuit current (the current Ip) flows from the resonant inductor Lr through the parasitic capacitance C2 (and thereafter, the parasitic diode D2) of the switching device S2, the capacitor Cf, the switching device S4, the primary low-voltage line L1L, the primary winding 31, and the resonant capacitor Cr in this order and back to the resonant inductor Lr. At this time, electric charge is discharged from the parasitic capacitance C2 of the switching device S2, and the parasitic diode D2 described above brings the voltage into a clamped state. The value of the voltage Vp at this time is as follows: Vp=(Vin/2) (see part (E) of FIG. 2). Then, on the secondary side of the transformer 3, the secondary circuit current (the current Is) flows from the secondary winding 321 through the output line LO, the output smoothing capacitor Cout, the ground line LG, and the rectifying diode 41 in this order and back to the secondary winding 321.

[State G]

Figure 9:
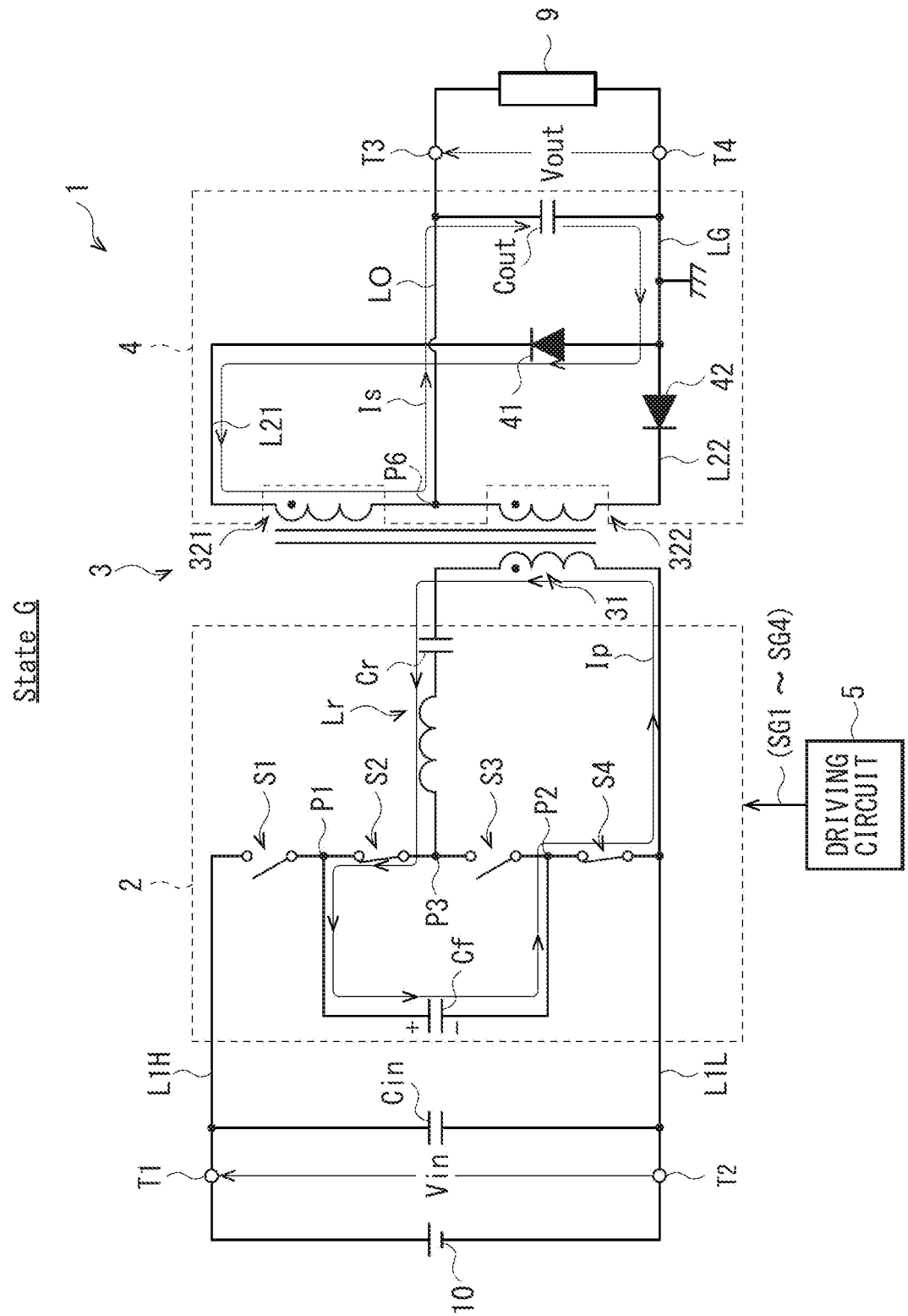
FIG. 9 is a circuit diagram illustrating an operation example at State G illustrated in FIG. 2.

Next, at the "State G" illustrated in FIG. 9, the switching device S2 may be turned on (see part (B) of FIG. 2) and ZVS may be performed. Then, on the primary side of the transformer 3, the primary circuit current (the current Ip) flows from the resonant inductor Lr through the switching device S2, the capacitor Cf, the switching device S4, the primary low-voltage line L1L, the primary winding 31, and the resonant capacitor Cr in this order and back to the resonant inductor Lr. The value of the voltage Vp at this time is as follows: Vp=(Vin/2) (see part (E) of FIG. 2). Then, on the secondary side of the transformer 3, the secondary circuit current (the current Is) flows from the secondary winding 321 through the output line LO, the output smoothing capacitor Cout, the ground line LG, and the rectifying diode 41 in this order and back to the secondary winding 321.

[State H]

Figure 10:
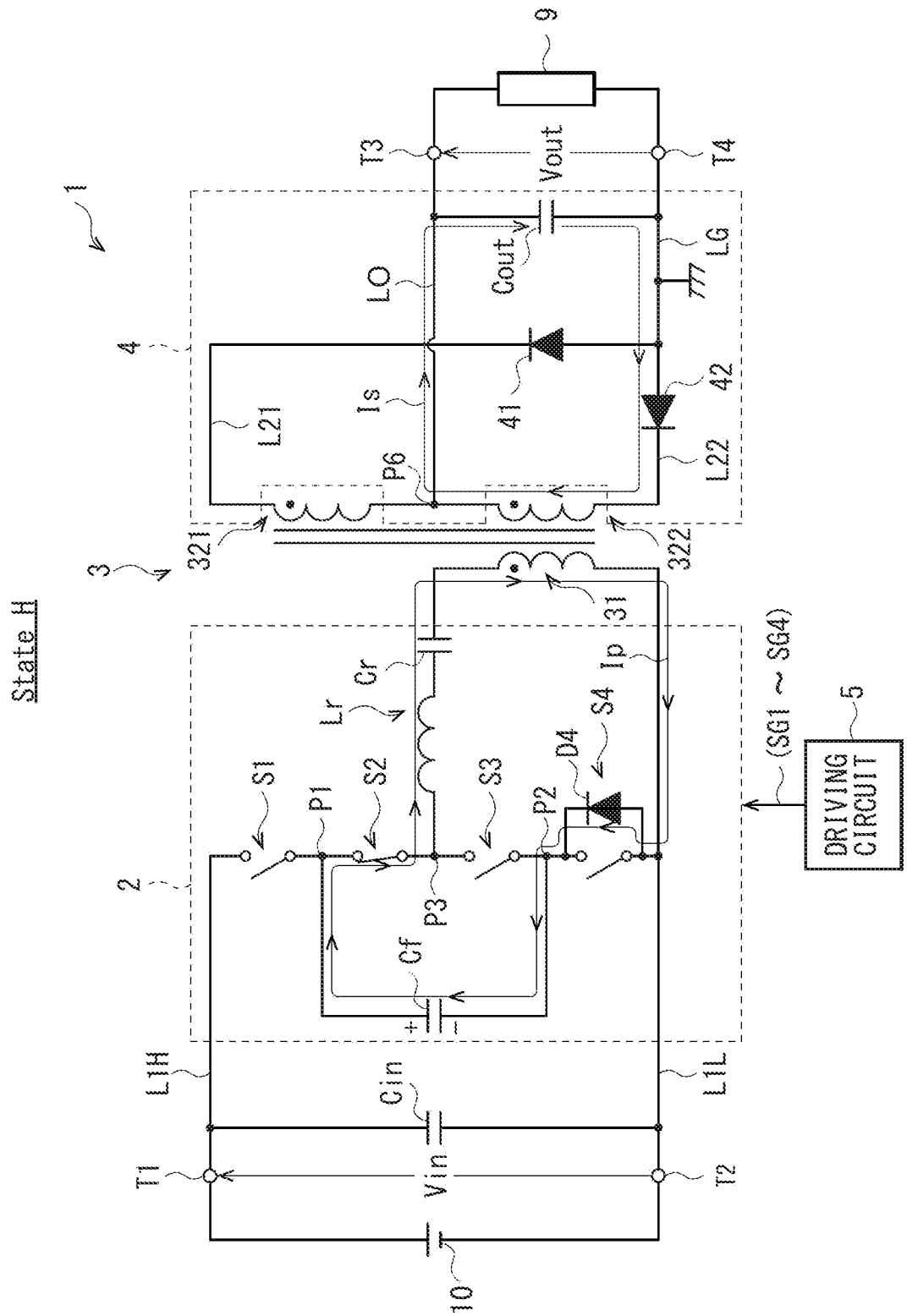
FIG. 10 is a circuit diagram illustrating an operation example at State H illustrated in FIG. 2.

Next, at the "State H" illustrated in FIG. 10, the switching device S4 may be turned off (see part (D) of FIG. 2). Then, on the primary side of the transformer 3, the primary circuit current (the current Ip) flows from the resonant inductor Lr through the sonant capacitor Cr, the primary winding 31, the primary low-voltage line L1L, the parasitic diode D4 of the switching device S4, the capacitor Cf, and the switching device S2 in this order and back to the resonant inductor Lr. Thus, the direction of flow of the current Ip during the preceding period from the "State E" to the "State G" is reversed. At this time, the parasitic diode D4 described above brings the voltage into a clamped state. The value of the voltage Vp at this time is as follows: Vp=(Vin/2) (see part (E) of FIG. 2). Then, on the secondary side of the transformer 3, the secondary circuit current (the current Is) flows from the secondary winding 322 through the output line LO, the output smoothing capacitor Cout, the ground line LG, and the rectifying diode 42 in this order and back to the secondary winding 322. Thus, the current Is flows through a path different from that during the preceding period from the "State E" to the "State G".

Here, as indicated with arrows in parts (A) to (D) of FIG. 2, the driving circuit 5 may adjust a start timing or a stop timing of each of the respective periods during which the switching devices S1 to S4 are on (i.e., the "H"-state periods). In a specific but non-limiting example, the driving circuit 5 may adjust the start timing of each of the respective periods during which the switching devices S1 and S4 are on, that is, the timing of the rise of each of the drive signals SG1 and SG4. Further, the driving circuit 5 may adjust the stop timing of each of the respective periods during which the switching devices S2 and S3 are on, that is, the timing of the fall of each of the drive signals SG2 and SG3. It is to be noted that in a case where the timing of the rise of each of the drive signals SG1 and SG4 is adjusted, the switching cycle Tsw described above is defined by a period from the timing of the rise of the drive signal SG2 to the timing of the rise of the drive signal SG2 at a next cycle, or by a period from the timing of the rise of the drive signal SG3 to the timing of the rise of the drive signal SG3 at a next cycle. By adjusting the start timing or the stop timing of each of such respective ON-state periods, the driving circuit 5 may control the value of the direct-current output voltage Vout as indicated with arrows in part (F) of FIG. 2, for example. Note that the illustration of the direct-current output voltage Vout in FIG. 2 disregards any voltage drops at the rectifying diodes 41 and 42.

Further, as illustrated in FIG. 2, for example, the driving circuit 5 may perform adjustments so that the ON period Ton during which both the switching devices S1 and S2 are on (the first ON period) and the ON period during which both the switching devices S3 and S4 are on (the second ON period) do not overlap each other in the switching cycle Tsw. Then, the driving circuit 5 may adjust the respective duty ratios of these ON periods (the first and second ON periods) to the switching cycle Tsw to thereby control the value of the direct-current output voltage Vout as indicated with the arrows in part (F) of FIG. 2, for example. That is, in the example of part (E) of FIG. 2, the duty ratio of the ON period Ton during which Vp=Vin and the duty ratio of the ON period Ton during which Vp=0 may each be adjusted to thereby control the value of the direct-current output voltage Vout.

The description of a series of operations, i.e., the pulse width control in the switching cycle Tsw, with reference to FIG. 2 and FIGS. 3 to 10 thus ends.

C. Workings and Effects

Next, example workings and example effects of the switching power supply unit 1 of the present example embodiment will be described in detail in comparison with a comparative example.

C-1. Comparative Example

Figure 11:
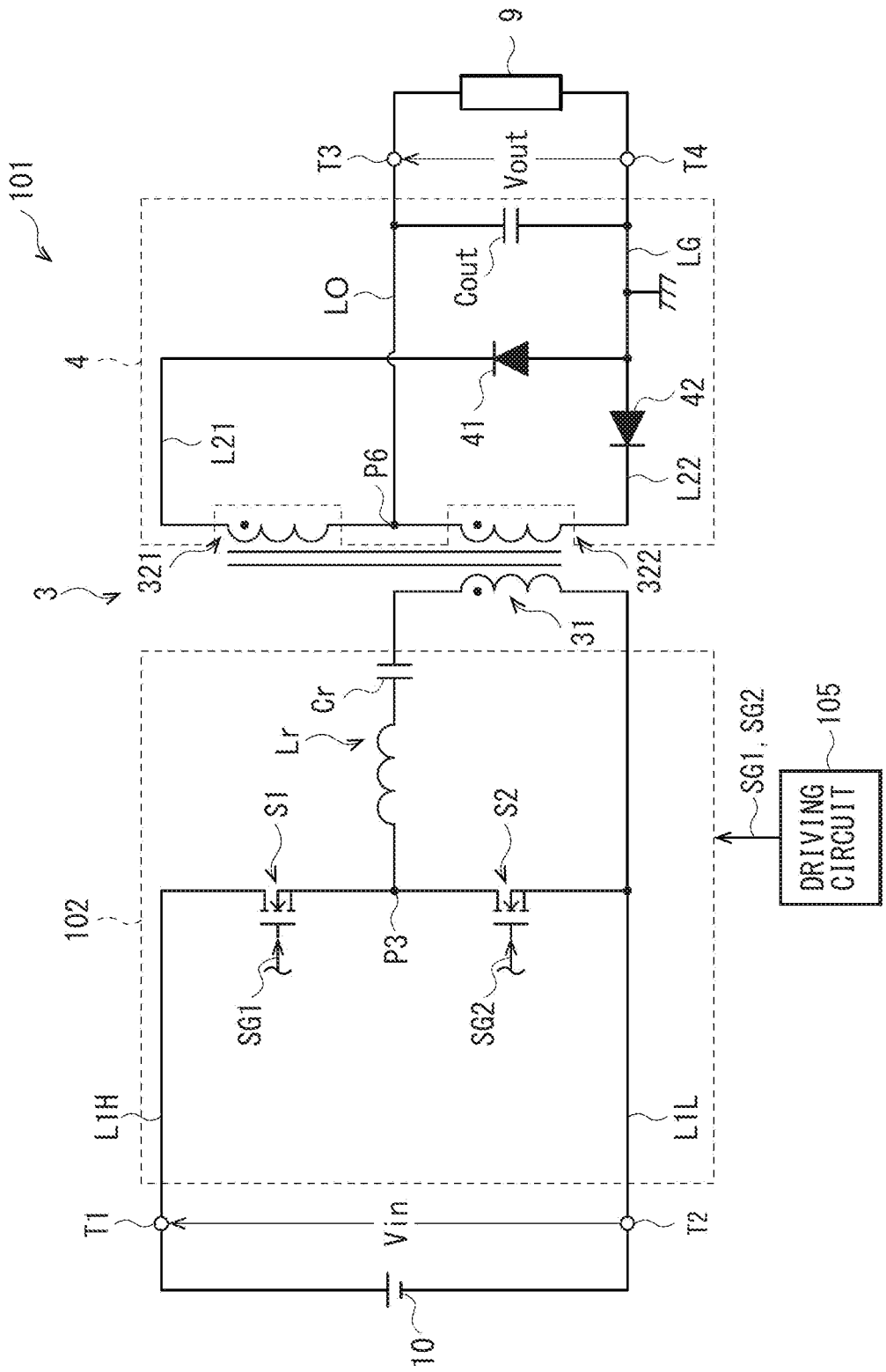
FIG. 11 is a circuit diagram illustrating a schematic configuration example of a switching power supply unit according to a comparative example.

FIG. 11 illustrates a schematic configuration example of a switching power supply unit according to a comparative example, i.e., a switching power supply unit 101, in a circuit diagram. The switching power supply unit 101 of this comparative example is an existing typical "LLC resonant" DC-DC converter. Specifically, the switching power supply unit 101 corresponds to the switching power supply unit 1 of the present example embodiment illustrated in FIG. 1 in which the inverter circuit 2, the transformer 3, and the driving circuit 5 are replaced with an inverter circuit 102, a transformer 103, and a driving circuit 105, respectively.

The inverter circuit 102 corresponds to the inverter circuit 2 of the present example embodiment from which the capacitor Cf is omitted and in which two switching devices S1 and S2 coupled in series to each other are provided in place of the four switching devices S1 to S4 coupled in series to each other. Specifically, the switching device S1 is disposed between the primary high-voltage line L1H and the connection point P3, and the switching device S2 is disposed between the connection point P3 and the primary low-voltage line L1L. As in the case of the inverter circuit 2, the resonant inductor Lr and the resonant capacitor Cr are coupled in series to each other between the connection point P3 described above and one end of the primary winding 31 of the transformer 103.

The driving circuit 105 is a circuit that performs switching driving to control respective operations of the switching devices S1 and S2 in the inverter circuit 102. Specifically, the driving circuit 105 is configured to supply the switching devices S1 and S2 with respective drive signals SG1 and SG2 independently of each other to thereby control the respective switching operations, i.e., on and off operations, of the switching devices S1 and S2.

In the switching power supply unit 101 of the comparative example (i.e., a typical "LLC resonant" DC-DC converter) having such a configuration, it is necessary to control the switching frequency fsw in order to stabilize the direct-current output voltage Vout. This makes the switching devices S1 and S2 narrower in operation range where soft switching is possible. Accordingly, if the direct-current input voltage Vin or the direct-current output voltage Vout varies greatly, a variation range of the switching frequency fsw becomes wider. This can give rise to concerns as described below in a case where, as in this comparative example, the ratio of the direct-current output voltage Vout to the direct-current input voltage Vin, i.e., the output to input voltage ratio, is high and the operating voltage range is wide.

Firstly, in the switching power supply unit 101 of the comparative example, the transformer 103 has a high transformation ratio or turns ratio (e.g., about 16:1), and therefore the primary winding 31 has a large number of turns in the transformer 103. This can lead to a large loss in the primary winding 31. Thus, in the switching power supply unit 101 of the comparative example, a large power loss can result due to the large loss in the primary winding 31 of the transformer 103.

It is to be noted that, in the switching power supply unit 101 of the comparative example, the switching frequency fsw varies over a wide range (e.g., from about 800 kHz to about 2 MHz) and it is therefore difficult to perform soft switching for each of the switching devices S1 and S2. This can result in an increase in switching loss and can thus necessitate an increase in size of a component such as a heat dissipation component. Thus, in the switching power supply unit 101 of the comparative example, a component such as the heat dissipation component can be increased in size and accordingly, the entire switching power supply unit can be increased in size. In addition, in the switching power supply unit 101 of the comparative example, burst control is needed when the load 9 is light or zero, for example.

C-2. Present Example Embodiment

In contrast, the switching power supply unit 1 of the present example embodiment is able to provide, for example, the following workings and effects in contrast to the switching power supply unit 101 of the comparative example described above, for example.

Firstly, according to the present example embodiment, the inverter circuit 2 has the above-described circuit configuration including the capacitor Cf. This allows the voltage Vp, i.e., the voltage to be applied to the resonant circuit including the resonant inductor Lr and the resonant capacitor Cr, to be multi-leveled (see part (E) of FIG. 2: Vp=Vin or Vp=(Vin/2)). This makes it possible set the transformation ratio of the transformer 3 to a low value. For example, the present example embodiment makes it possible to set the transformation ratio to 8:1, which is half the value of the transformation ratio in the comparative example, i.e., 16:1. As a result, in the transformer 3 of the present example embodiment, it is possible to reduce the number of turns of the primary winding 31 to, for example, ½ that in the transformer 103 of the above-described comparative example, and it is therefore possible to reduce a loss in the primary winding 31.

Consequently, according to the present example embodiment, it is possible to reduce a power loss in the switching power supply unit 1 as compared with, for example, the above-described comparative example.

Further, in the present example embodiment, as has been described, the switching driving of the switching devices S1 to S4 may be performed in such a manner that the respective switching frequencies fsw of the switching devices S1 to S4 are identical with each other and constant. This results in the following. That is, soft switching of each of the switching devices S1 to S4 is facilitated as compared with the case of the above-described comparative example, and therefore switching loss is reduced as compared with the case of the above-described comparative example. As a result, it is possible to achieve a reduction in size of a component such as a heat dissipation component. Accordingly, the present example embodiment makes it possible to achieve a reduction in size of the switching power supply unit 1 as compared with, for example, the above-described comparative example.

Further, in the present example embodiment, the pulse width control described above may be performed (see FIG. 2). This makes it possible to control the value of the direct-current output voltage Vout in the above-described manner. Furthermore, it is possible for the rectifying diodes 41 and 42 to operate in a discontinuous mode. It is thus possible to achieve a reduction in noise. In addition, it is possible to improve the reliability of the switching power supply unit 1.

Further, according to the present example embodiment, the value of the direct-current output voltage Vout may be controlled by shifting the phases of the switching devices S1 to S4 (the drive signals SG1 to SG4) from each other while fixing the respective duty ratios of the switching devices S1 to S4. This makes it possible to easily control the value of the direct-current output voltage Vout. Further, this simplifies the control (i.e., switching driving) of the switching devices S1 to S4, thus making it possible to improve the reliability of the switching power supply unit 1.

Further, in the present example embodiment, the resonant inductor Lr in the inverter circuit 2 may be configured by the leakage inductance of the transformer 3. This makes it unnecessary to separately provide the resonant inductor Lr, thus allowing for a reduction in the number of components. As a result, it is possible for the switching power supply unit 1 to achieve a further reduction in size and a reduction in cost.

In addition, according to the present example embodiment, each of the switching devices S1 to S4 in the inverter circuit 2 may be configured by a MOS-FET. This makes it possible to raise the switching frequency fsw, thus making it possible to achieve a reduction in component size.

Further, according to the present example embodiment, the rectifying circuit in the rectifying and smoothing circuit 4 may be a center-tap rectifying circuit. This allows the number of the rectifying devices to be reduced to two (the rectifying diodes 41 and 42) as compared with Modification Example 1 to be described below, for example. As a result, it is possible to achieve reductions in size, loss, and cost of the rectifying circuit.

2. Modification Examples

Next, modification examples (Modification Examples 1 to 3) of the foregoing example embodiment will be described. It is to be noted that, in the following description, components substantially the same as those of the switching electric power supply system 1 according to the foregoing example embodiment are denoted by the same reference signs, and descriptions thereof are omitted as appropriate.

Modification Example 1

[Configuration]

Figure 12:
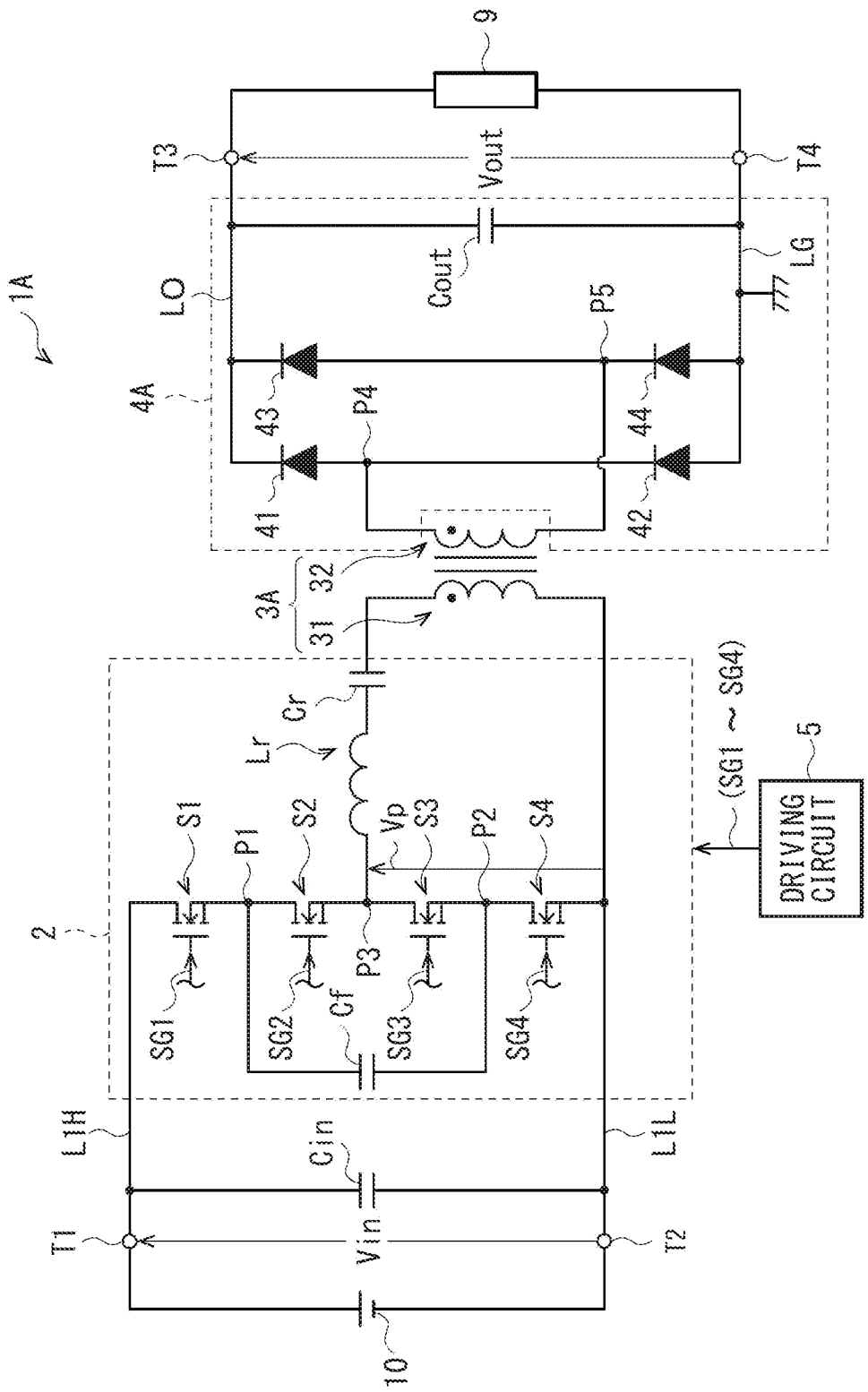
FIG. 12 is a circuit diagram illustrating a schematic configuration example of a switching power supply unit according to one modification example.

FIG. 12 illustrates a schematic configuration example of a switching power supply unit according to Modification Example 1, i.e., a switching power supply unit 1A, in a circuit diagram.

As with the foregoing example embodiment, a system including the direct-current input power source 10 and the switching power supply unit 1A may correspond to a specific but non-limiting example of the "electric power supply system" of one embodiment of the technology.

The switching power supply unit 1A of Modification Example 1 corresponds to the power supply unit 1 of the foregoing example embodiment in which the transformer 3 and the rectifying and smoothing circuit 4 are replaced with a transformer 3A and a rectifying and smoothing circuit 4A, respectively. The remainder of configuration of the switching power supply unit 1A may be similar to that of the switching power supply unit 1.

The transformer 3A may include a single primary winding 31 and a single secondary winding 32. That is, in contrast to the transformer 3 including the two secondary windings 321 and 322, the transformer 3A may include only a single secondary winding 32. The secondary winding 32 may have a first end coupled to a connection point P4 in the rectifying and smoothing circuit 4A to be described later, and a second end coupled to a connection point P5 in the rectifying and smoothing circuit 4A.

Like the transformer 3, the transformer 3A may be configured to perform voltage conversion on a voltage generated by the inverter circuit 2, that is, the multi-leveled voltage Vp and output an alternating-current voltage, i.e., the voltage Vs, from the end of the secondary winding 32. Note that the voltage conversion degree of the output voltage with respect to the input voltage in this case may be determined on the basis of the turns ratio of the primary winding 31 to the secondary winding 32, and the duty ratios of the ON periods Ton to the foregoing switching cycle Tsw.

The rectifying and smoothing circuit 4A may include four rectifying diodes 41 to 44 and a single output smoothing capacitor Cout. In a specific but non-limiting example, the rectifying and smoothing circuit 4A includes a rectifying circuit including the rectifying diodes 41 to 44, and a smoothing circuit including the output smoothing capacitor Cout. That is, the rectifying and smoothing circuit 4A may correspond to the rectifying and smoothing circuit 4 with its configuration modified.

Note that the four rectifying diodes 41 to 44 described above may correspond to a specific but non-limiting example of the "two or more rectifying devices" of one embodiment of the technology.

The rectifying circuit of Modification Example 1 may be a so-called "bridge" rectifying circuit, being different from the "center-tap" rectifying circuit of the foregoing example embodiment. That is, respective cathodes of the rectifying diodes 41 and 43 may be coupled to the output line LO; and the anode of the rectifying diode 41 may be coupled to the cathode of the rectifying diode 42 and the above-described first end of the secondary winding 32 at the connection point P4. Further, respective anodes of the rectifying diodes 42 and 44 may be coupled to the ground line LG; and a cathode of the rectifying diode 44 may be coupled to an anode of the rectifying diode 43 and the above-described second end of the secondary winding 32 at the connection point P5.

In the rectifying and smoothing circuit 4A having such a configuration, as in the rectifying and smoothing circuit 4, the rectifying circuit including the rectifying diodes 41 to 44 may rectify the alternating-current voltage (the voltage Vs) outputted from the transformer 3A, and then output the rectified voltage.

[Workings and Effects]

The switching power supply unit 1A of Modification Example 1 having such a configuration is basically able to provide effects similar to those of the switching power supply unit 1 of the foregoing example embodiment through similar workings.

Further, in Modification Example 1, the rectifying circuit in the rectifying and smoothing circuit 4A may be a bridge rectifying circuit, in particular. This reduces the number of the windings, that is, reduces the number of the secondary windings to one (i.e., the secondary winding 32) in the transformer 3A as compared with the foregoing example embodiment, for example. As a result, it is possible to achieve reductions in size and loss of the transformer 3A.

Modification Examples 2 and 3

Switching power supply units according to Modification Examples 2 and 3, that is, switching power supply units 1B and 1C, respectively correspond to the switching power supply units 1 and 1A according to the foregoing example embodiment and Modification Example 1 in which the respective rectifying circuits in the rectifying and smoothing circuits 4 and 4A are so-called synchronous rectifying circuits, as described below.

As with the foregoing example embodiment or Modification Example 1, a system including the direct-current input power source 10 and the switching power supply unit 1B or 1C may correspond to a specific but non-limiting example of the "electric power supply system" of one embodiment of the technology.

In the synchronous rectifying circuits in Modification Examples 2 and 3, the rectifying diodes 41 and 42 (in Modification Example 2) and the rectifying diodes 41 to 44 (in Modification Example 3) may each be configured by a MOS-FET. In these synchronous rectifying circuits, the MOS-FETs themselves may be controlled to be turned on in synchronization with a period during which the respective parasitic diodes of the MOS-FETs are conducting, that is, to perform synchronous rectification.

The switching power supply units 1B and 1C of Modification Examples 2 and 3 having such configurations are basically able to provide effects similar to those of the switching power supply units 1 and 1A of the foregoing example embodiment and Modification Example 1 through similar workings.

In each of Modification Examples 2 and 3, in particular, the two or more rectifying devices (rectifying diodes) in the rectifying circuit may each be configured by a MOS-FET, and the rectifying circuit may be a synchronous rectifying circuit. Such a synchronous rectifying circuit reduces a conduction loss upon rectification. Accordingly, it is possible to achieve reductions in size and loss of the rectifying circuit.

3. Other Modification Examples

The technology has been described above with reference to the example embodiment and the modification examples. However, embodiments of the technology are not limited thereto, and may be modified in a variety of ways.

For example, in the foregoing example embodiment and the modification examples, description has been given of specific configurations of the inverter circuit by way of example. However, such examples are non-limiting, and any other configuration may be employed for the inverter circuit. More specifically, for example, arrangement of the resonant inductor Lr, the resonant capacitor Cr, and the primary winding 31 with respect to each other is not limited to the one described in any of the example embodiment and the modification examples, and these components may be arranged in no particular order with respect to each other.

Further, in the foregoing example embodiment and the modification examples, description has been given of specific configurations of the transformer (the primary winding and the secondary winding) by way of example. However, such examples are non-limiting, and any other configuration may be employed for the transformer (the primary winding and the secondary winding).

Further, in the foregoing example embodiment and the modification examples, description has been given of specific configurations of the rectifying and smoothing circuit (the rectifying circuit and the smoothing circuit) by way of example. However, such examples are non-limiting, and any other configuration may be employed for the rectifying and smoothing circuit (the rectifying circuit and the smoothing circuit).

In addition, in the foregoing example embodiment and the modification examples, description has been given of specific techniques by which the driving circuit controls (i.e., performs switching driving of) the operations of the switching devices by way of example. However, such examples are non-limiting, and any other techniques may be employed as the switching driving techniques. More specifically, for example, the technique for performing the pulse width control, the technique for obtaining the multi-leveled voltage Vp, etc. described in the foregoing example embodiment and the modification examples are non-limiting, and any other techniques may be employed.

Further, in the foregoing example embodiment and the modification examples, description has been given of a DC-DC converter as an example of the switching power supply unit according to an embodiment of the technology. However, any embodiment of the technology is applicable to other kinds of switching power supply units such as AC-DC converters.

Moreover, any two or more of the configuration examples described so far may be combined and applied in a desired manner.

The technology encompasses any possible combination of some or all of the various embodiments and the modifications described herein and incorporated herein.

It is possible to achieve at least the following configurations from the foregoing embodiments and modification examples of the technology.

(1)

A switching power supply unit including:
- a pair of input terminals configured to receive an input voltage;
- a pair of output terminals configured to output an output voltage;
- a transformer including a primary winding and a secondary winding;
- an inverter circuit disposed between the pair of input terminals and the primary winding, and including first to fourth switching devices, a first capacitor, a resonant inductor, and a resonant capacitor;
- a rectifying and smoothing circuit disposed between the pair of output terminals and the secondary winding, and including a rectifying circuit and a smoothing circuit, the rectifying circuit including two or more rectifying devices, the smoothing circuit including a second capacitor; and
- a driver configured to perform switching driving to control respective operations of the first to fourth switching devices in the inverter circuit, in which
- the first to fourth switching devices are coupled in series to each other in this order between two input terminals constituting the pair of input terminals, the first capacitor is disposed between a first connection point and a second connection point, the first connection point being a connection point between the first switching device and the second switching device, the second connection point being a connection point between the third switching device and the fourth switching device, and the resonant inductor, the resonant capacitor, and the primary winding are coupled in series to each other in no particular order between a third connection point and one of the two input terminals constituting the pair of input terminals, the third connection point being a connection point between the second switching device and the third switching device.

(2)
The switching power supply unit according to (1), in which the driver is configured to perform the switching driving in such a manner that respective switching frequencies of the first to fourth switching devices are identical with each other and constant.

(3)
The switching power supply unit according to (1) or (2), in which the resonant inductor is configured by a leakage inductance of the transformer.

(4)
The switching power supply unit according to any one of (1) to (3), in which each of the first to fourth switching devices is configured by a metal oxide semiconductor-field effect transistor.

(5)
The switching power supply unit according to any one of (1) to (4), in which the rectifying circuit includes a center-tap rectifying circuit.

(6)
The switching power supply unit according to any one of (1) to (4), in which the rectifying circuit includes a bridge rectifying circuit.

(7)
The switching power supply unit according to any one of (1) to (6), in which
each of the two or more rectifying devices is configured by a metal oxide semiconductor-field effect transistor, and
the rectifying circuit includes a synchronous rectifying circuit.

(8)
The switching power supply unit according to any one of (1) to (7), in which the driver is configured to control a value of the output voltage by adjusting a start timing or a stop timing of each of respective periods during which the first to fourth switching devices are to be on.

(9)
The switching power supply unit according to any one of (1) to (8), in which
a switching cycle in the switching driving includes:
a first ON period during which both the first switching device and the second switching device are to be on;
a second ON period during which both the third switching device and the fourth switching device are to be on;
a first dead time during which both the first switching device and the fourth switching device are to be off; and
a second dead time during which both the second switching device and the third switching device are to be off, and the driver is configured to control a value of the output voltage by preventing the first ON period and the second ON period from overlapping each other in the switching cycle and by adjusting each of a duty ratio of the first ON period and a duty ratio of the second ON period to the switching cycle.

(10)
An electric power supply system including:
the switching power supply unit according to any one of (1) to (9); and
a power source configured to supply the input voltage to the pair of input terminals.

The switching power supply unit and the electric power supply system according to at least one embodiment of the technology make it possible to reduce a power loss.

Although the technology has been described hereinabove in terms of the example embodiment and modification examples, it is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:
1. A switching power supply unit comprising:
a pair of input terminals configured to receive an input voltage;
a pair of output terminals configured to output an output voltage;
a transformer including a primary winding and a secondary winding;
an inverter circuit disposed between the pair of input terminals and the primary winding, and including:
first to fourth switching devices coupled in series to each other in this order between the pair of input terminals;
a first connection point between the first switching device and the second switching device;
a second connection point between the third switching device and the fourth switching device;
a third connection point between the second switching device and the third switching device;
a first capacitor disposed between the first connection point and the second connection point;
a resonant inductor; and
a resonant capacitor, the resonant inductor, the resonant capacitor, and the primary winding being coupled in series to each other between the third connection point and one of the pair of input terminals;
a rectifying and smoothing circuit disposed between the pair of output terminals and the secondary winding, and including a rectifying circuit and a smoothing circuit, the rectifying circuit including two or more rectifying devices, the smoothing circuit including a second capacitor;
a switching cycle in the switching driving including:
   a first ON period during which both the first switching device and the second switching device are to be on;
   a second ON period during which both the third switching device and the fourth switching device are to be on;
   a first dead time during which both the first switching device and the fourth switching device are to be off; and
   a second dead time during which both the second switching device and the third switching device are to be off; and
a driver configured to:
   perform switching driving to control respective operations of the first to fourth switching devices in the inverter circuit; and
   control a value of the output voltage by preventing the first ON period and the second ON period from overlapping each other in the switching cycle and by adjusting each of a duty ratio of the first ON period and a duty ratio of the second ON period to the switching cycle.

2. The switching power supply unit according to claim 1, wherein the driver is configured to perform the switching driving in such a manner that respective switching frequencies of the first to fourth switching devices are identical with each other and constant.

3. The switching power supply unit according to claim 1, wherein the resonant inductor comprises a leakage inductance of the transformer.

4. The switching power supply unit according to claim 1, wherein each of the first to fourth switching devices is configured by a metal oxide semiconductor-field effect transistor.

5. The switching power supply unit according to claim 1, wherein the rectifying circuit comprises a center-tap rectifying circuit.

6. The switching power supply unit according to claim 1, wherein the rectifying circuit comprises a bridge rectifying circuit.

7. The switching power supply unit according to claim 1, wherein the driver is configured to control a value of the output voltage by adjusting a start timing or a stop timing of each of respective periods during which the first to fourth switching devices are to be on.

8. An electric power supply system comprising:
   the switching power supply unit according to claim 1; and
   a power source configured to supply the input voltage to the pair of input terminals.

* * * * *